United States Patent
Swoboda

(10) Patent No.: US 7,565,965 B2
(45) Date of Patent: Jul. 28, 2009

(54) SET OF ROLLER CONVEYORS

(75) Inventor: Werner Swoboda, Boeblingen (DE)

(73) Assignee: Eisenmann Anlagenbau GmbH & Co. KG., Boeblingen (DE)

( * ) Notice: Subject to any disclaimer, the term of this patent is extended or adjusted under 35 U.S.C. 154(b) by 214 days.

(21) Appl. No.: 11/701,176

(22) Filed: Feb. 1, 2007

(65) Prior Publication Data

US 2007/0235291 A1 Oct. 11, 2007

(30) Foreign Application Priority Data

Feb. 8, 2006 (DE) ................. 10 2006 005 980

(51) Int. Cl.
*B65G 13/06* (2006.01)
(52) U.S. Cl. ................. 198/788; 198/789; 198/780
(58) Field of Classification Search ......... 198/780–789; 193/35 R, 37
See application file for complete search history.

(56) References Cited

U.S. PATENT DOCUMENTS

| | | | |
|---|---|---|---|
| 3,857,473 A | 12/1974 | Kornylak | |
| 4,248,341 A | 2/1981 | Schuck et al. | |
| 4,781,286 A * | 11/1988 | Weaver | 198/789 |
| 5,058,727 A * | 10/1991 | Jahns et al. | 198/460.1 |
| 5,186,308 A * | 2/1993 | Munro | 198/572 |
| 5,228,558 A * | 7/1993 | Hall | 198/784 |
| 5,318,167 A * | 6/1994 | Bronson et al. | 198/577 |
| 5,462,156 A * | 10/1995 | Kobayashi et al. | 198/788 |
| 6,021,888 A * | 2/2000 | Itoh et al. | 198/783 |
| 6,244,427 B1 * | 6/2001 | Syverson | 198/788 |
| 6,415,914 B2 * | 7/2002 | Itoh et al. | 198/781.06 |
| 6,450,325 B1 * | 9/2002 | Devnani | 198/788 |
| 6,459,224 B2 * | 10/2002 | Itoh et al. | 318/445 |
| 6,731,094 B1 * | 5/2004 | Itoh et al. | 318/727 |
| 6,959,804 B2 * | 11/2005 | Helgerson et al. | 198/805 |
| 7,104,395 B2 * | 9/2006 | Brown et al. | 198/781.06 |

(Continued)

FOREIGN PATENT DOCUMENTS

DE 2328206 A 1/1974

(Continued)

OTHER PUBLICATIONS

German Office Action.

(Continued)

*Primary Examiner*—Gene Crawford
*Assistant Examiner*—William R Harp
(74) *Attorney, Agent, or Firm*—Factor & Lake, Ltd.

(57) ABSTRACT

A set of roller conveyors is described, the members of which include a plurality of driven rollers disposed in two parallel tracks. Each member of the set has at least one electric feed-in block, which is connectable to the locally available system voltage and from this generates an output voltage, which is the same for all members of the set and is lower than or equal to the lowest system voltage, for which a member of the set is designed. The drive motors of the driven rollers are in this case designed for the output voltage of the feed-in block. In this way, the manufacturer of the roller conveyors may carry out the design, warehousing, and assembly of a roller conveyor independently of the different system voltages available from site to site and in this way may considerably reduce the costs associated therewith.

14 Claims, 1 Drawing Sheet

U.S. PATENT DOCUMENTS

| | | | |
|---|---|---|---|
| 7,207,433 B2 * | 4/2007 | Schaefer | 198/788 |
| 7,360,638 B2 * | 4/2008 | Ko et al. | 198/575 |
| 7,374,036 B2 * | 5/2008 | Dingler et al. | 198/788 |
| 2004/0016626 A1 * | 1/2004 | Helgerson et al. | 198/788 |
| 2004/0084284 A1 * | 5/2004 | Brown et al. | 198/780 |
| 2005/0024010 A1 * | 2/2005 | Tachibana | 318/801 |
| 2006/0086593 A1 * | 4/2006 | Brown et al. | 198/781.1 |
| 2006/0118392 A1 * | 6/2006 | El-Ibiary | 198/781.03 |
| 2006/0151299 A1 * | 7/2006 | Schaefer | 198/788 |
| 2007/0181406 A1 * | 8/2007 | Swoboda | 198/780 |
| 2007/0181407 A1 * | 8/2007 | Dingler et al. | 198/789 |
| 2008/0116041 A1 * | 5/2008 | Hall | 198/790 |

FOREIGN PATENT DOCUMENTS

| | | |
|---|---|---|
| DE | 2838974 C2 | 3/1980 |
| DE | 8907852 U1 | 8/1989 |
| EP | 1107443 A1 | 6/2001 |
| EP | 1118588 A2 | 7/2001 |

OTHER PUBLICATIONS

Applicant's co-pending U.S. Appl. No. 11/701,175 entitled Roller Conveyor, filed Feb. 1, 2007.

Applicant's co-pending U.S. Appl. No. 11/701,169 entitled Roller Conveyor, filed Feb. 1, 2007.

* cited by examiner

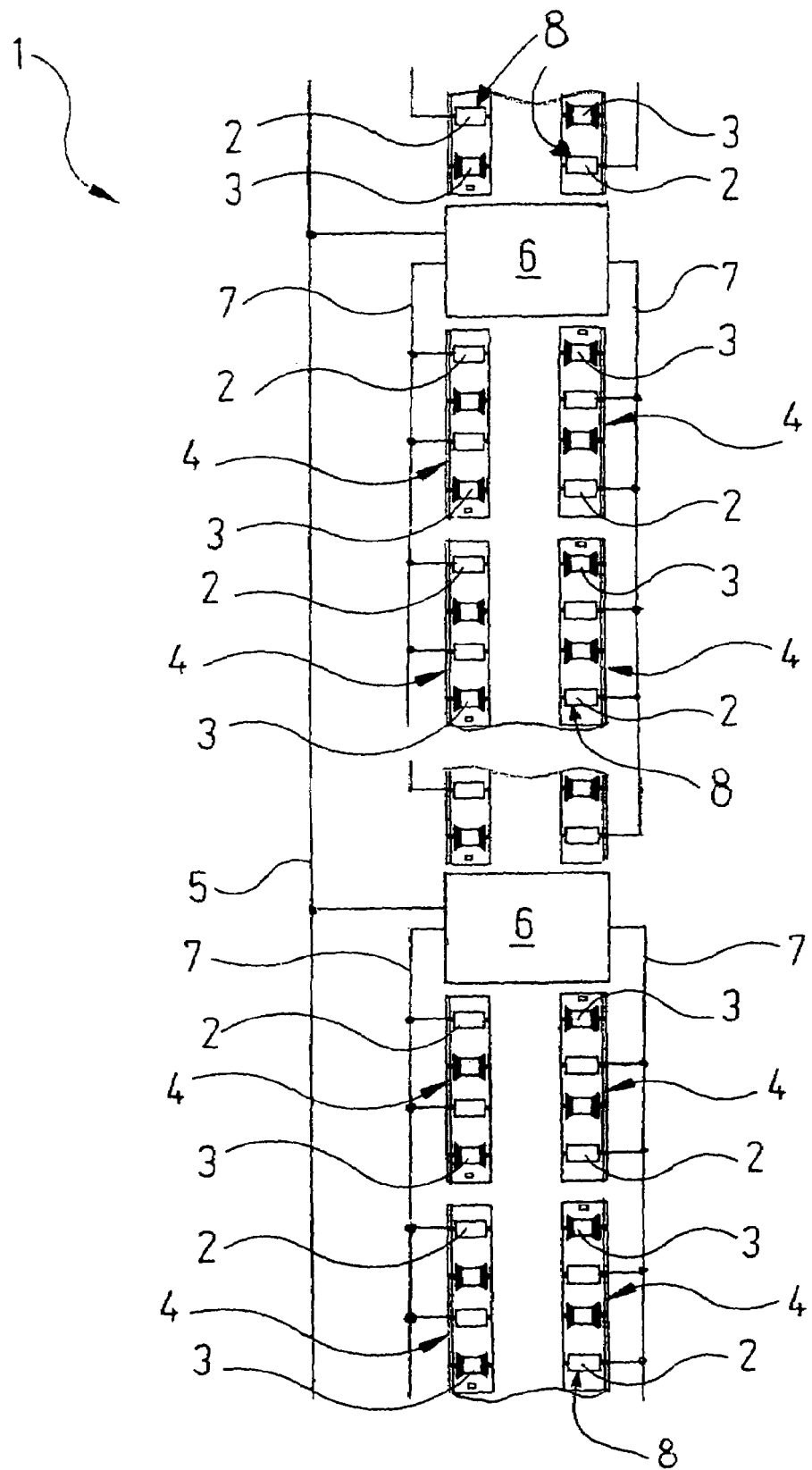

SET OF ROLLER CONVEYORS

RELATED APPLICATIONS

The present invention claims the benefit of the filing date of German Patent Application, Serial No. 10 2006 005 980.8, filed Feb. 8, 2006; the content of which is incorporated by reference herein.

This application also relates to concurrently filed U.S. patent application Ser. No. 11/701,169, now U.S. Pat. No. 7,374,036, titled ROLLER CONVEYOR; and, Ser. No. 11/701,175, titled ROLLER CONVEYOR.

TECHNICAL FIELD

The invention relates to a set of roller conveyors, the members of which comprise in each case a plurality of driven rollers disposed in two parallel tracks; a plurality of electric drive motors for the driven rollers; and a connector for connection to the local system voltage.

BACKGROUND OF THE INVENTION

Roller conveyors are used to transport goods carriers such as e.g. pallets. In the automobile industry they are often used to transfer vehicle bodies or parts of vehicle bodies between individual processing stations. The vehicle bodies are in said case fastened on so-called skids. This term is used for transport racks that have two mutually parallel skid runners. During the conveying operation the skid runners rest on rollers of the roller conveyor, which are disposed successively in conveying direction along two tracks. When the rollers are set in rotation, the skid with the vehicle body fastened thereon is fed in conveying direction, wherein it is sufficient to provide only some of the rollers with a rotary drive.

The manufacturers of roller conveyors of the initially described type currently on the market are generally global players. They encounter widely differing locally available system voltages in the various countries where they intend to commission roller conveyors. It is a frequent occurrence to come across voltages of between 200 V and 600 V. The different locally available output voltages compel the manufacturers of roller conveyors to redesign each roller conveyor that is to be manufactured, buy in and individually assemble and wire components corresponding to the locally available system voltage and provide costly warehousing for different components. The piece numbers of the individual components remain comparatively low. All of this contributes towards relatively high costs.

The present invention is provided to solve these and other problems.

SUMMARY OF THE INVENTION

The object of the present invention is to provide a set of roller conveyors of the initially described type, with which it is possible to reduce the costs of installation, maintenance, design, and warehousing.

This object is achieved according to the invention in that each member of the set has at least one electric feed-in block, which is connectable to the local system voltage and from this generates an output voltage that is the same for all members of the set and is lower than or equal to the lowest supply voltage, for which a member of the set is designed; and the drive motors of the driven rollers are designed for the output voltage of the feed-in blocks.

The concept according to the invention for reducing costs is therefore as follows:

A roller conveyor manufacturer specifies a specific—in his view optimum—operating voltage for the drive motors, to which all of the systems to be installed then conform worldwide, independently of the system voltage that is available there. The generation of this "standard" operating voltage for the drive motors of the driven rollers from the respective available system voltage is then effected by means of individual feed-in blocks. The designing of a member of the roller conveyor set according to the invention may therefore be effected substantially independently of the local conditions; substantially identical components are used, which may be pre-produced in relatively large piece numbers. Individual adaptation to the local conditions is required exclusively for the electric feed-in block that carries out the conversion of the locally available system voltage to the "standard" operating voltage of the drive motors.

The adaptation of the locally available system voltage to the operating voltage of the drive motors may be effected for example in that the manufacturer of the roller conveyor stocks a plurality of different feed-in blocks, which are designed for different system voltages but may all generate the same operating voltage for the drive motors of the driven rollers. With this concept, there are therefore as many different types of feed-in block as there are different system voltages to be encountered in the area of activity of the manufacturer of roller conveyors.

Very much more convenient, however, is the form of construction of the invention whereby only one type of feed-in block is provided, which is designed in such a way that, given various system voltages at its input, it may automatically generate the same operating voltage for the drive motors of the driven rollers. Such circuits are known to the person skilled in the art; they need not therefore be described in detail here. Given the use of such an "adaptive" feed-in block, it is therefore possible to carry out the design and construction of a roller conveyor totally independently of the local conditions. From the locally available system voltage the "adaptive" feed-in block according to the invention always automatically supplies the desired "standard" operating voltage for the drive motors.

In an advantageous form of construction, each member of the set of roller conveyors has a plurality of identical feed-in blocks, which are disposed at intervals from one another and supply in each case the drive motors of the driven rollers in an associated segment of the roller conveyor. By virtue of this feed-in of the operating voltage at different points of the roller conveyor it is possible to prevent voltage drops that might otherwise occur given the use of only a single feed-in block and very long roller conveyors.

The operating voltage of the drive motors, which is preferably a direct voltage, should be lower than 60 V. Such "low voltages" reduce the safety requirements and the costs of the employed semiconductor components as well as the losses thereof, so that this measure also leads to reduced costs.

A particularly favorable compromise is when the operating voltage of the drive motors for the driven rollers is approximately 48 V. The advantages associated with the "low voltage concept" are then already highly pronounced without however the currents that flow in individual cases having to assume too high values.

It is also advantageous to use an operating voltage of 24V because many semiconductor components or semiconductor circuits that are commercially obtainable are designed for such an operating voltage.

These and other objects and advantages will be made apparent from the following brief description of the drawings and the detailed description of the invention.

BRIEF DESCRIPTION OF THE DRAWINGS

There now follows a detailed description of an embodiment of the invention with reference to the drawing; the single FIGURE shows in diagrammatic plan view a roller conveyor with some of the associated cabling.

DETAILED DESCRIPTION OF THE INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The roller conveyor illustrated in the drawing and denoted as a whole by the reference character 1 comprises a plurality of driven rollers 2 and free-wheeling rollers 3 in two tracks, which run parallel to one another. In longitudinal direction of the roller conveyor 1, which is simultaneously conveying direction, in each case a driven roller 2 alternates with a free-wheeling roller 3, wherein in the two tracks in each case a driven roller 2 lies opposite a free-wheeling roller 3.

In each case four rollers, of which two are driven rollers 2 and two are free-wheeling rollers 3, are mounted in a common rectangular or hollow channel section and thereby form a roller rail 4. The two tracks of the roller conveyor 1 are constructed by means of a successive arrangement of substantially identical roller rails 4.

The electric drive motors 8 that set the various driven rollers 2 in rotation are hub d.c. motors, which are not visible in the drawing and are operated preferably with a voltage of 48 V. The operating voltage of the drive motors 8 is "standardized" by the respective manufacturer of the roller conveyor 1 in the sense that it is the same for every application in every country.

At the site of installation of the roller conveyor 1 a system voltage is available that differs extensively from site to site, in particular from country to country. This system voltage is present in a power supply line, which is provided in the drawing with the reference character 5 and extends along the entire roller conveyor 1. Inserted at specific regular intervals, for example every 50 metres, into the two tracks there is a so-called feed-in block 6, which is connected in each case to the mains cable 5. The feed-in block 6 contains a circuit arrangement, which from the possibly locally different system voltage along the mains cable 5 always generates the same output voltage, namely the previously mentioned operating voltage of the drive motors of, in the example, 48 V.

This output voltage is output by the feed-in blocks 6 at two outputs, to each of which an operating voltage line 7 is connected. The two operating voltage lines 7 run parallel to the two tracks of the roller conveyor 1 composed of roller rails 4 and supply all of the driven rollers 2 between the respective feed-in block 6 and the last driven roller 2 before the adjacent feed-in block 6. In this way, the entire drive circuit for the driven rollers 2 is subdivided into individual segments, which are galvanically isolated from one another.

When designing and installing a roller conveyor 1, its manufacturer no longer has to take account of the local conditions regarding the voltage ratios. Rather, planning is carried out totally independently on the basis of standardized components, which may therefore be pre-produced by the manufacturer in large piece numbers. The use of a plurality of individual drive motors leads in the event of failure of an individual drive motor to a specific redundancy, because then adjacent driven rollers 2 may simultaneously take over the function of the failed roller 2.

In an embodiment that is not illustrated in the drawing, the feed-in block 6 contains two circuit arrangements that carry out the previously described conversion of the system voltage, which is present on the line 5, to the operating voltage of the driven rollers 2. Each of these circuit arrangements then supplies only one set of driven rollers 2 in the adjacent segment, so that in the event of the failure of one circuit phase the other remains operational and an emergency operation of the roller conveyor 1, albeit with less acceleration and at a lower speed in the segment in question, is possible.

Control of the various driven rollers 2 is effected via an industry-standard bus system.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

What is claimed is:

1. A set of roller conveyors having multiple members, the members of which are arranged to be connected to different local system voltages, each member of the set comprising:
   a plurality of driven rollers disposed in two parallel tracks;
   a plurality of electric drive motors for the driven rollers;
   a connector for connection to the local system voltage;
   wherein
   each member of the set has at least one individual electric feed-in block, which is different for each member of the set, while otherwise all members of the set have substantially identical components,
   the electric feed-in block is connectable to the local system voltage and from this generates an output voltage, which is the same for all members of the set and is lower than or equal to the lowest system voltage, for which a member of the set is designed; and,
   the drive motors of the driven rollers are designed for the output voltage of the feed-in block.

2. The set of roller conveyors of claim 1, wherein a plurality of different feed-in blocks are provided, which are designed for different system voltages but may all generate the same operating voltage for the drive motors of the driven rollers.

3. The set of roller conveyors of claim 2, wherein each member has a plurality of identical feed-in blocks, which are disposed at intervals from one another and supply in each case the drive motors of the driven rollers in an associated segment of the roller conveyor.

4. The set of roller conveyors of claim 3, wherein the operating voltage of the drive motors for the driven rollers is lower than 60 V.

5. The set of roller conveyors of claim 2, wherein the operating voltage of the drive motors for the driven rollers is lower than 60 V.

6. The set of roller conveyors of claim 1, wherein only one type of feed-in block is provided, which is designed in such a way that it may automatically generate for different system voltages at its input the same operating voltage for the drive motors of the driven rollers.

7. The set of roller conveyors of claim 6, wherein each member has a plurality of identical feed-in blocks, which are disposed at intervals from one another and supply in each case the drive motors of the driven rollers in an associated segment of the roller conveyor.

8. The set of roller conveyors of claim 7, wherein the operating voltage of the drive motors for the driven rollers is lower than 60 V.

9. The set of roller conveyors of claim 6, wherein the operating voltage of the drive motors for the driven rollers is lower than 60 V.

10. The set of roller conveyors of claim 1, wherein each member has a plurality of identical feed-in blocks, which are disposed at intervals from one another and supply in each case the drive motors of the driven rollers in an associated segment of the roller conveyor.

11. The set of roller conveyors of claim 10, wherein the operating voltage of the drive motors for the driven rollers is lower than 60 V.

12. The set of roller conveyors of claim 1, wherein the operating voltage of the drive motors for the driven rollers is lower than 60 V.

13. The set of roller conveyors of claim 12, wherein the operating voltage of the drive motors for the driven rollers is approximately 48 V.

14. The set of roller conveyors of claim 12, characterized in that the operating voltage of the drive motors for the driven rollers is approximately 24 V.

* * * * *